United States Patent [19]

Schlafer et al.

[11] 3,920,983

[45] Nov. 18, 1975

[54] MULTI-CHANNEL OPTICAL COMMUNICATIONS SYSTEM UTILIZING MULTI WAVELENGTH DYE LASER

[75] Inventors: John D. Schlafer; Alexander Lempicki; Harold Samelson, all of Wayland; Vernon John Fowler, Andover, all of Mass.

[73] Assignee: GTE Laboratories Incorporated, Waltham, Mass.

[22] Filed: Oct. 10, 1973

[21] Appl. No.: 404,969

[52] U.S. Cl. ........... 250/199; 179/15 R; 179/15 FD

[51] Int. Cl. ........................................... H04b 9/00

[58] Field of Search..................... 250/199; 178/5.4; 332/7.51; 179/15 R, 15 FD

[56] References Cited

UNITED STATES PATENTS

| | | | |
|---|---|---|---|
| 3,604,936 | 9/1971 | Kompfner | 250/199 |
| 3,633,034 | 1/1972 | Uchida et al. | 250/199 |
| 3,633,035 | 1/1972 | Uchida et al. | 250/199 |
| 3,676,684 | 7/1972 | DeLange | 250/199 |
| 3,676,795 | 7/1972 | Pratt, Jr. | 250/199 |
| 3,710,015 | 1/1973 | Fowler | 178/5.4 |
| 3,752,992 | 8/1973 | Fluhr | 250/199 |

OTHER PUBLICATIONS

Arthurs et al.: Frequency Tunable Transform-Limited, pp. 480–482, Picosecond Dye Laser Pulses. Applied Physics Letters, Vol. 19, Dec. 1971.

Kinsel: Wide band Optical Comm. Systems: Part I, Time Division Multiplexing, Proc. IEEE Vol. 58, Oct. 1970, pp. 1666–1683.

DeLange: Wide-band Optical Comm. Systems: Part II, Frequency Division Multiplexing, Proc. IEEE, Vol. 58, Oct. 1970, pp. 1683–1690.

*Primary Examiner*—Felix D. Gruber
*Attorney, Agent, or Firm*—Irving M. Kriegsman; Bernard L. Sweeney

[57] ABSTRACT

A multi-channel optical communications system provides simultaneous optical communications over a plurality of different, non-interfering wavelengths. A multi-wavelength dye laser provides a plurality of optical carriers in a single beam. The laser beam is separated into a plurality of parallel beams each having its own discrete center carrier frequency. Each beam is passed through a multi-channel electro-optic modulator wherein each carrier is separately modulated. All the modulated beams are then recombined on a common optical axis and this beam may be transmitted to a receiver. In the receiver the single beam may again be separated into a plurality of beams and applied to an array of detectors wherein the signals are demodulated.

13 Claims, 4 Drawing Figures

MULTI-CHANNEL OPTICAL COMMUNICATIONS SYSTEM UTILIZING MULTI WAVELENGTH DYE LASER

FIELD OF THE INVENTION

This invention relates generally to a communications system, and more particularly to an optical communications system utilizing a multi-wavelength laser.

BACKGROUND OF THE INVENTION

Demands for wider bandwidth per subscriber channel come from the gradually increasing usage of video telephones, closed circuit television and other broadband communications systems. A recent forecast made for the telephone industry predicts a breakthrough in distribution technology. Optical communications may be the candidate that could fulfill this prediction.

Optical communications, by means of optic fibers, lasers, light emitting diodes, avalanche detectors, and modulators may become pre-eminent in telecommunications in the next two decades. The promise that this technology brings is wide bandwidth at low cost. Today, unit costs for some of the components are discouragingly high, but with several sectors of the industry showing serious interest in this mode of communication, costs for components should come down drastically. Predictions of cost competitiveness for optical devices, plus the arrival of integrated optics within five years, make optical communications systems most attractive.

Prior wideband optical communications systems have the disadvantages that the overall bandwidth of a single-channel optical communications systems is severely limited by the bandwidth achievable in single optical modulators and detectors. Further, where separate lasers are used in a multi-channel optical communications system, the number of channels is limited by the number of available laser types and wavelengths. The cost of these systems is high because of the large number of lasers required, each of a different design. Moreover, the communications system would be complicated and bulky owing to the large number of individual components and the room required for multiplexing the various beams. Many dichroic elements would be required, each introducing loss and adding cost to the system. Such a system would require many adjustable components, thereby becoming costly to assemble and align and subject to mechanical instabilities; therefore, it is an object of the present invention to produce an inexpensive, dependable optical communications system for frequency-division multiplex transmission.

A further object of the invention is to use a single laser to provide simultaneous communication over a plurality of optical channels.

SUMMARY OF THE INVENTION

The present invention relates to an optical communications system using frequency division multiplex transmission over widely separated optical channels. The optical communications system includes a transmitter and receiver. The transmitter section comprises a laser emitting multi-wavelength beam, a beam separator, a multi-channel optical modulator, a beam collimator and an optical coupler to launch the modulated beam. The receiver comprises a collector and a single multi-channel optical detector array. This system provides simultaneous communication over a plurality of optical channels, each directly modulated in intensity or polarization by one of a plurality of electrical input signals.

The optical channels are about equally spaced in wavelength by an amount $\Delta\lambda$, each confined to a band less than $\Delta\lambda$ wide (probably about ½ $\Delta\lambda$), and collectively occupying a spectrum about $N\Delta\lambda$ wide centered about a wavelength $\lambda_0$, where N is the number of channels. For example, with N equal to 20 channels, $\Delta\lambda$ equals 1.0 nanometers (nM) spacing between channels, then ½ $\Delta\lambda$ optical bandwidth for each channel equals 0.5 nM, covering a spectrum $N\Delta\lambda$ equal to 20 nanometers wide at a center wavelength of 610 nM. This optical bandwidth is expected to be very large compared with the electrical bandwidth of each modulator and detector element in the system.

According to one embodiment, the optical carriers are provided by a continuous wave (cw) dye laser which is capable of providing simultaneous oscillations over many wavelengths, about equally spaced in a particular wide segment of the optical spectrum. The dye laser may be used with a suitable mode selection/suppression device, such as an etalon, to cause its oscillations to occur in clusters of wavelengths with the desired spacing between clusters of $\Delta\lambda$. This type of laser typically oscillates with many modes having lines separated by about 0.1 nM. Thus, each cluster could have about 5–10 lines, all contributing power to a single optical channel. Instabilities in the dye laser cause variations in the intensity of the individual lines, keeping the total power per channel relatively constant and well above a useful threshold. An advantage of the dye laser is that it can be made operative over wavelength ranges in the red and infrared portion of the spectrum where scatter losses are low in optical fibers and where solid state detectors are quite efficient.

In the transmitter section of the optical communications system, the output beam of the dye laser contains a plurality of optical carriers. These carriers may be separated into a plurality of beams, separately modulated and recombined on a common optical axis by a method described in U.S. Pat. No. 3,710,015 issued Jan. 9, 1973, and assigned to the same assignee as this present application.

According to one embodiment, the single beam emerging from a dye laser is passed through an optical system which simultaneously disperses and focuses the multi-wavelength beam from the dye laser into a plurality of beams, each beam having a different center frequency. The plurality of beams are passed simultaneously through a multi-channel electro-optic modulator capable of modulating each beam with a wide band input signal. The modulated beams emerging from the multi-channel modulator are recombined by a second optical system, preferably symmetric to the first optical system. The second optical system reconverges the modulated beams to a common axis and collimates the beams along that axis.

Transmission of the multichannel modulated beam will involve some means, for example, beam coupler for launching the modulated beams through an optical transmission medium (fiber, pipe, or air path) and a similar means for extracting the beam at the receiving end. If repeaters are required, they can be dye laser amplifiers, either incorporated into the optical transmission medium or coupled in successive sections of that medium with additional beam couplers.

In the receiver section of the optical communications system, the modulated beam is collected and processed by a beam coupler. From the beam coupler the received beam is passed through an optical system similar to the two in the transmitter. The receiver optical system causes the received beam to be divided into a plurality of beams, each having its own characteristic center frequency. The separated beams are then directed into an array of photodetectors. The detectors demodulate the beams and thereby extract the wideband information. This information may then be processed by conventional electronic means well known in the art.

An advantage of the present invention is that the present invention can provide many communication channels, each with an electrical bandwidth of 10's or 100's of megahertz, thereby achieving more bandwidth than most other proposed laser communications systems.

A further advantage is that for whatever total bandwidth is required, only a fraction of that bandwidth is required of each of the modulator and detector elements. Typically, that bandwidth could match the bandwidth of the signal sources such as wideband picture telephones or CATV cables. The present invention could, therefore, multiplex the outputs of many of these sources without the need for additional electrical multiplex circuits.

A further advantage is that this optical communication system is inherently compact and simple to construct, requiring only a single structure for each function (laser, laser pump, modulator, detector, etc.), rather than a plurality of structures for each function. The cost of the laser source is thus prorated against a number of channels, and the cost per channel is similarly reduced for all other components.

An even further advantage, owing to the symmetry of the two optical systems in the transmitter, is that the functions of beam separation and recombination are achieved with a minimum of mechanical adjustment and automatically achieve a high degree of accuracy.

The features of the present invention which are believed to be novel are set forth with particularity in the attendant claims. The invention, together with further objects and advantages thereof, may best be understood with reference to the following description taken in connection with the drawings.

DESCRIPTION OF THE PREFERRED EMBODIMENT

Figure 1:
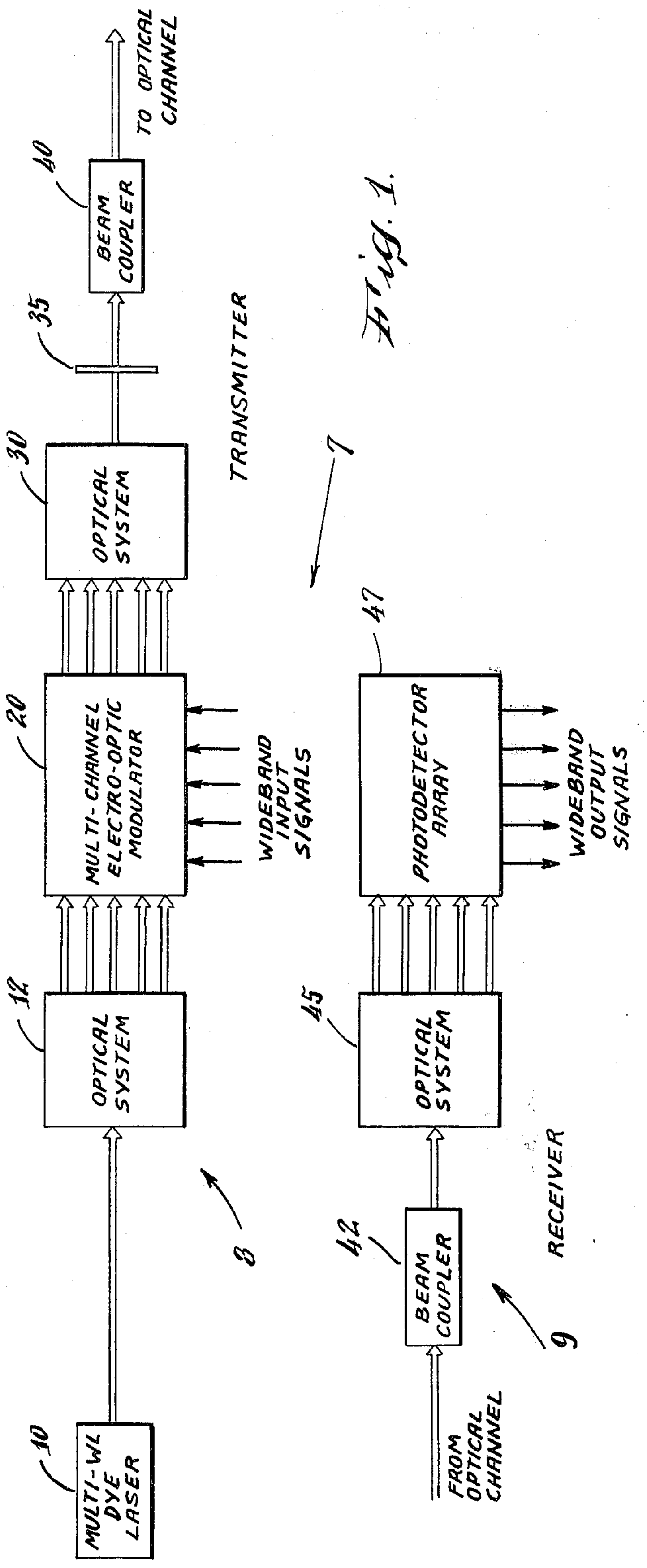
FIG. 1 is a block diagram of the optical communication system of this invention.

Referring now to FIG. 1, there is shown a diagrammatic representation of the optical communication system 7 of this invention. The communication system comprises a transmitter section 8 and a receiver section 9. The input laser beam is a multi-wavelength coaxial beam of light, preferably generated within a single dye laser cavity. The dye laser is needed to provide simultaneous oscillations over many wavelengths, about equally spaced in a particular wide segment of the optical spectrum. One example of such a laser is a continuously flowing Rhodamine 6G dye laser pumped by blue or green radiation. This dye laser has an output in the range from 5600 to 6200 angstroms at 10 or more milliwatts power. The spectral width of the laser output depends upon the mode structure of the resonator. Since dye lasers have a very broad gain curve, the output can be 100–200 $cm^{-1}$ wide. The modes of a resonator are defined by the spacing of the mirrors ($L_0$), the difference in wave number frequency $\Delta\nu_0$ between adjacent modes being:

$$\Delta\nu_0 = \frac{1}{2L_0\, n} cm^{-1}$$

where $n$ is the refractive index of the resonator material. Since typically a dye laser would have a mirror spacing $L_0 = 10$ cm, where $n \approx 1$, $\Delta\nu_0$ is of the order of 0.05$cm^{-1}$. Such a small difference in wave number frequency between adjacent modes is not normally resolved.

The presence of a pair of partially reflecting parallel surfaces inside the cavity separated a distance $L_1$ will impose a modulation of the longitudinal modes of the resonator. The result will be that the output of the laser will no longer be composed of the totality of the original longitudinal modes but will be made up of clusters of modes. Their separation will be equal to $\Delta\nu_1 = ½ L_1 n_1$ where $n_1$ is the refractive index of the material between the reflective surfaces. The pair of parallel surfaces mentioned above is often introduced into the laser by the two windows of the dye cell. The interior faces, where the reflections occur, are typically separated by a distance $L_1 \approx 0.1$ cm. Hence, with $n \approx 1.36$ for the laser solution, $\Delta\nu_1$ is about 3.75 $cm^{-1}$. This can be achieved, however, in other ways. For instance, a thin etalon can be placed in the cavity and the windows of the cell can be wedged in order to suppress their influence.

In a cavity having a pair of partially reflecting surfaces as described above, a further separation of the clusters can be achieved by placing in the cavity a thin etalon of thickness $L_2$ of the order of 0.1 mm. In this case, the clusters of the modes will be separated by a spacing $\Delta\nu_2$=

$$\frac{1}{2L_2 n_2}$$

Thus, for example, using $n_2 = 1.5$ for quartz, $\Delta\nu_2$ is calculated to be typically about 35 $cm^{-1}$. Each of the clusters can then be considered as an optical channel. Each cluster could have about five to 10 lines, all contributing power to a single optical channel. Instabilities in the dye laser are expected to cause variations in the intensity of the individual lines, keeping the total power per channel relatively constant and well above a useful threshold. The laser cavity may also contain a polarizing element if the laser 10 is not inherently linearily polarized, or a polarizer can be placed at the output of the laser. A further discussion of dye laser operation and properties may be found in Jacobs, et al. article entitled "Losses in CW Dye Lasers" Journal of Applied Physics, January 1973, Vol. 44 No. 1, pp. 263–272.

Figure 2B:
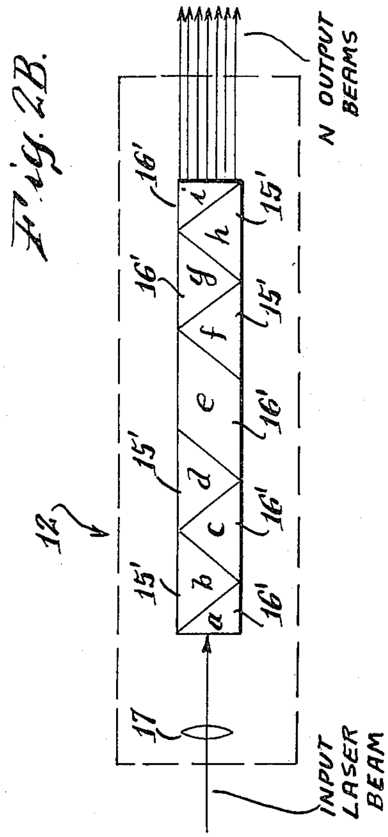
FIG. 2B is a diagram of a second embodiment of the optical system shown in 2A.
Figure 2A:
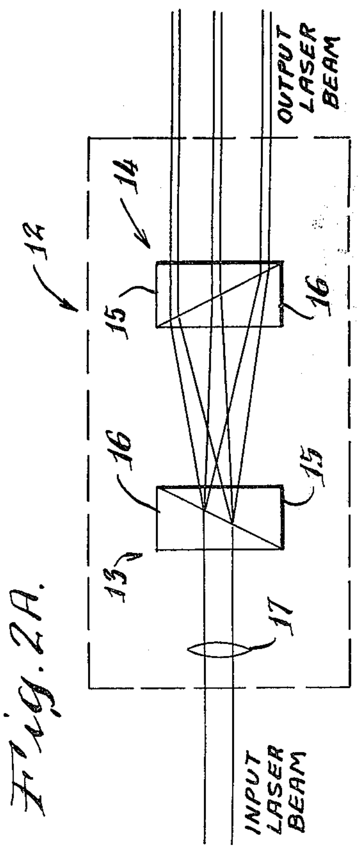
FIG. 2A is a diagram of the optical system shown in FIG. 1.

The output of the dye laser 10 is a single beam containing the N desired optical carriers. These carriers are separated into N separate beams, each of which has its own characteristic center frequency. Such separation may be obtained by using an optical system 12 which disperses and focuses the N beams. As shown in FIG. 2A the optical system 12 may preferably comprise a pair of identical direct-vision prism spectroscopes 13 and 14, each spectroscope being composed of a low-dispersion glass element 15 and a high dispersion glass element 16 each having the same refractive index for the wavelength of the central channel. Alternatively, a single glass prism can be used in place of each prism spectroscope. A pair of direct vision spectroscopes can also be made by utilizing a plurality of high and low dispersion glass elements as shown in the embodiment of FIG. 2B. The first direct-vision prism spectroscope comprises prisms *a, b, c, d* and a portion of prism *e*, and the second direct-vision prism spectroscope comprises the remaining portion of prism *e* and prisms *f, g, h*, and *i*. A different number of prisms can be used with more prisms providing greater separation of wavelengths. A lens 17 may be used with each of the above embodiments to narrow the beam diameter and reduce the amount of angular dispersion required from the spectroscope to physically separate the N beams such that each can be individually modulated.

Figure 3:
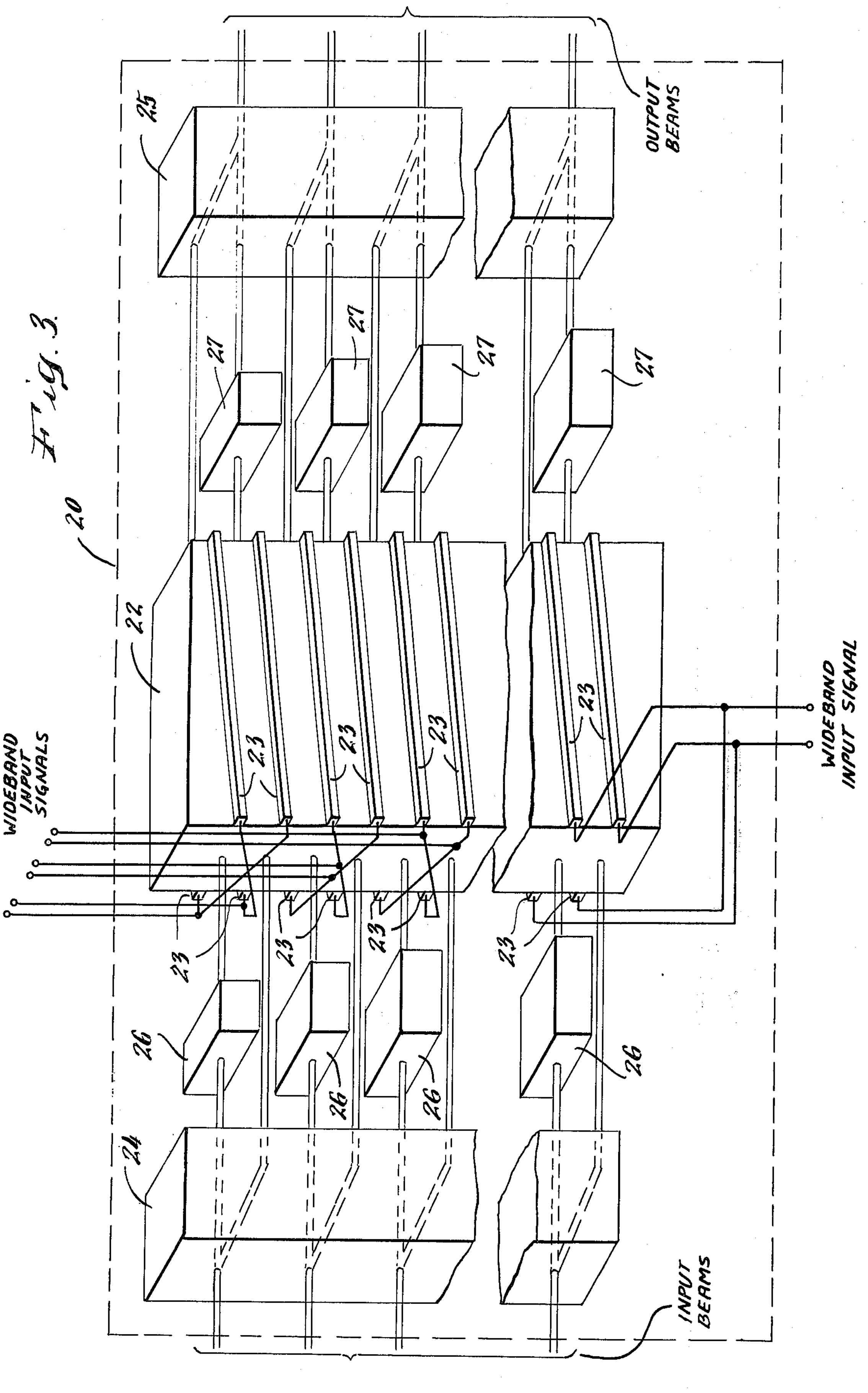
FIG. 3 is a diagrammatic representation of the multichannel electro-optic modulator shown in FIG. 1.

After emerging from optical system 12, the various beams of light are processed through a multi-channel electro-optic modulator generally designated 20. As shown in FIG. 3, the modulator 20 preferably includes an electro-optic crystal 22 with electrodes 23, polarization beam splitters 24 and 25, and 90° polarization rotators 26 and 27. The electro-optic modulator preferably is of the transverse field type in which the single electro-optic crystal 22 is made, for example, from 45° Y-cut ammonium dihydrogen phosphate (ADP). The modulator is a parallel path interferometer in which the interfering beams pass between adjacent pairs of electrodes 23 mounted on the crystal 22, as shown in FIG. 3. This single crystal configuration makes the modulator more rugged than conventional two-crystal modulators and results in stable operation with high optical powers and under changes in ambient temperature. All of the optical interfaces between components may be coupled with the dielectric fluid to minimize reflective loss.

In operation, the input beams enter modulator 20 with a polarization of 45° to the plane of the crystal 22. Each beam is separated into two parallel components by the polarization beam splitter 24 which is made, for example, from a 45° Y-cut calcite crystal (or other strongly birefringent material). The two components of each beam emerging from splitter 24 are of equal intensity but polarized orthogonally. The components of each beam leave splitter 24 as parallel rays separated by a small amount. The vertically polarized component of each beam then passes through the rotator 26, which rotates the vertical component polarization 90° so that both components are linearily polarized in the plane of the crystal 22. In general, a separate rotator element will be required for each beam if the rotation coefficient of the material or means used is wavelength dependent. Two possible methods of achieving this 90° rotation are: (1) the use of an optically active material, such as quartz, which rotates the polarization of linearily polarized light continuously as it passes along the crystal optic axis and (2) the use of birefringent material, commonly quartz or mica, to form which is commonly known as a "half-wave plate", obtaining a 90° polarization rotation through differential retardation of the orthogonal components of a linearily polarized beam. Upon entering the crystal 22, each pair of rays propagate, side by side, under individual electrodes 23. The driving wideband input signal, applied to the electrode pair in phase opposition, induces a phase differential between the two components of the optical beam in proportion to the applied electric field and the pertinent electro-optic coefficient $R_{41}$ in ADP. The horizontally polarized beam component emerging from crystal 22 previously unrotated by rotator 26 passes through rotator 27 which rotates the polarization 90° so that both components are returned to their original orthogonal relationship. Both rays are then passed through polarization splitter 25 wherein the rays are combined to form a beam containing both components which emerge from modulator 20. The polarization state of the emerging beam is a function of the phase differential of the two components induced by the modulating signal.

A number of advantages arise from using a single electro-optic crystal in this configuration with the two-beam components traveling adjacent to each other through the same crystal. The crystal fabrication problem is simplified, since only one crystal must be polished and crystallographic orientation is automatically the same relative to both beams. Mechanically and thermally, both optic paths are very closely coupled, so that strain or temperature induced path length differences are minimized. In ADP the $R_{41}$ electro-optic coefficient is quite large and therefore the half-wave retardation voltage is low. Furthermore, for the electric field direction associated with this orientation, the piezoelectric coefficient is negligible; therefore, no acoustic waves are generated in the crystal by the input signal. Thus, the modulator is free of piezoelectric resonance effects. Most electro-optic crystal materials exhibiting a transverse electro-optic effect can be used in this configuration, e.g., potassium dideuterium phosphate (KDDP), potassium dihydrogen phosphate (KDP), lithium niobate and lithium tantalate.

The beams emerging from the multi-channel electro-optic modulator 20 are passed through a second optical system 30, which is of similar construction as optical system 12 described hereinbefore. The second optical system 30, preferably symmetric to the first optical system 12, converges the modulated beams to a common axis and collimates the beams on that axis.

The collimated beam emerging from optical system 30 passes through a polarization analyzer 35 which converts the polarization modulation induced by modulator 20, FIG. 1, to intensity (amplitude) modulation. The beam is then applied to a beam coupler 40 for launching the modulated beam through an optical transmission medium (fiber, pipe or air path). If repeaters are required, they can be dye laser amplifiers either incorporated into the optical transmission medium or coupled to successive sections of that medium with additional beam couplers.

The transmitted beam is received from the optical channel by the receiver section 9 of the optical communications system. The first stage of the receiver is a second beam coupler 42 which extracts the information from the optical channel. After the received beam passes through the beam coupler 42, it is applied to an optical system 45. This optical system 45 is similar to the two systems 12 and 30 in the transmitter section 7, in that it causes the channels to be separated and directed into a plurality of N parallel beams. The N separated channels are then applied to a photo-detective array 47, which is preferably a solid-state design on a single semiconductor chip. Fiber optic elements could be used if necessary, to improve coupling to the individual detectors, or to simplify the prism system design. The output of the photodetector array 47 comprises N channels of information and may be handled by a conventional electrical processing system.

Considering the operation of the optical communication system, the laser 10 has a cavity which causes the output beam to have oscillations which occur in clusters of wavelengths with the desired spacing between clusters. From laser 10 the beam is directed to an optical system 12 which causes a wavelength dependent angular dispersion of the laser beam thereby separating the input laser beam into a number of individual beams of light, with each individual beam of light corresponding to one of the wavelength components in the original laser beam. Due to the wavelength distribution in the input laser beam, the separated beams of light consist of N clusters of wavelengths of light with the beams of light in each cluster having approximately the same bandwidth. After substantial angular separation of the beams of light, the elements in the optical system orient the beams into N parallel spaced-apart plane polarized beams of light. Thus, N parallel beams of light corresponding to the wavelength components of the input laser beam emerge from the optical system 12. Optical system 12 may also contain a lens which may be used to reduce the diameter of the beam. The formation of a narrow-diameter laser beam permits the use of thin electro-optic crystals which require relatively low modulating signal power or voltage and minimize the amount of dispersion needed to separate and recombine the multiwavelength beam. Alternatively, the diameter of the laser beam can be reduced by use of the converging lens at the output of the laser cavity to cause the output beam to be convergent.

The individual beams are transmitted from system 12 to the electro-optic modulator where each beam is separately modulated. The modulator 20 is a parallel path interferometer type in which the interfering beams pass between adjacent pairs of electrodes on a single electro-optic crystal 22. The modulator 20 is arranged so that the electric vector of each beam of light is oriented at an intermediate angle, typically 45°, to the modulator axis. All the incoming beams are split into two components, one horizontally polarized and the other vertically polarized, by polarization beam splitter 24. One component of the beam is rotated 90° by the rotator 26 so that both components are linearily polarized in the plane of the electro-optic crystal. By making the strip electrodes 23 at least as wide as the beam diameter of the cluster, all the wavelengths in each cluster can be modulated simultaneously and utilized. The strip electrodes 23 are positioned on opposite faces of the crystal parallel to each component beam of light to form 2N modulation sections. A modulation signal applied to the electrodes causes a variation in refractive index of the electro-optic crystal along the light polarization direction causing the components of each beam to be velocity modulated. The modulation signal is applied in phase opposition between the two components of the same beam which introduces a phase differential between the two components which produces a change of polarization of the output beam. Upon emerging from the electro-optic crystal 22, the other component which was not originally rotated is transmitted to the second 90° rotator 27. The rotator is so arranged to provide 90° rotation of the direction of the polarization vector of the beam of light after it transverses the modulator. This arrangement results in restoring both components of each beam to their original orthogonal orientation. Both components of each beam are transmitted to the second beam splitter crystal 25. The crystal is so arranged to recombine the two components of each beam. Thus, N parallel modulated beams emerge from the electro-optic modulator 20.

The N modulated beams are transmitted to the second optical system 30. The second system is similar to the first optical system 12 but is so arranged to combine N beams into a single coaxial wavelength frequency division multiplexed beam of light. The collimated beam emerging from system 30 is passed through a polarization analyzer 35 which converts the polarization modulation induced by modulator 20 to intensity modulation. This modulated beam of light may be launched by an appropriate beam coupler 40 through an optical transmissive medium such as optical fiber, pipe or air path. The modulated beam may then be collected at a remote location and separated into N parallel beams by an optical system 45, similar in construction to the optical systems 12 and 30 in the transmitter section. The N parallel beams of light emerging from the optical system 45 are then directed into a photodetector array 47. The array 47 demodulates the wide band information carried by each of the N beams. The demodulated signal may then be processed by conventional electronic apparatus as is well known in the art.

A modulator such as 20 with optical systems such as 12 and 30 has been built and operated with the capability of simultaneous modulation of 4 wavelengths. The modulator was constructed of ADP for the wavelengths 488.0, 514.5, 568.2 and 647.1 nm using a 45° Y-cut crystal plate 0.75 mm thick, 19 mm wide, with a 50 mm length along the optical path. The extreme wavelengths were separated by 11.8 mm and the parallel components of each wavelength by 1.1 mm in the crystal.

The driving point capacitance seen by the input signal was 104 pF for each electrode set. An extinction ratio of 50:1 was obtained with a half-wave retardation drive voltage of 64 volts peak-to-peak at 647.1 nm. The shorter wavelengths had proportionally smaller peak-to-peak drive voltages. Some low amplitude acoustic resonances were observed, apparently excited by fringing fields of the drive signal not perpendicular to the electrode surfaces, and in a direction which may show some piezoelectric effect. These mechanical vibrations were completely damped by coupling the ADP crystal to its support with a high viscosity dielectric fluid. Operation at continuous optical power densities up to 400 watt/sq. cm. showed no shift in the optical bias or operating point of the modulator.

The various features and advantages of the invention are thought to be clear from the foregoing description. Various other features and advantages not specifically enumerated will undoubtedly occur to those versed in the art, as likewise will many variations and modifications of the preferred embodiment illustrated, all of which may be achieved without departing from the spirit and scope of the invention as defined by the following claims.

What is claimed is:

1. An optical communications system having a plurality of frequency multiplexed modulated signals in a single beam comprising a continuous wave dye laser emitting light energy in a like plurality of bands each of which contains a narrow group of wavelengths, the central wavelengths thereof being regularly spaced in wavelength across the spectrum of wavelengths which the dye laser may emit, means for spatially separating the bands of light energy into a like plurality of generally parallel beams of light, each beam of light being restricted to wavelengths of light contained in a different one of the bands.

a multi-channel optical modulator for simultaneously imposing independently wideband information on each of the plurality of bands, the multi-channel optical modulator comprising means for dividing the light energy in each band into a pair of spatially separated generally parallel, orthogonally polarized components, a 90° polarization rotator disposed in the path of an identically selected one of each pair of components so that all of the components are similarly plane polarized, an electro-optic crystal disposed in the paths of all of the similarly plane polarized components and crystallographically oriented so as to effect phase retardation in the planes in which the components are polarized upon application of an electric field in the planes, means for applying simultaneously independently modulated electric fields in all of the planes, the electric fields being applied in the two planes of each pair of components being in phase opposition, a 90° polarization rotator disposed in the path of the other one of each pair of components after the components exit from the electro-optic crystal so that an orthogonal polarization relationship is reestablished between each pair of components, and means for recombining the pairs of components into a plurality of modulated beams, and, means for recombining the plurality of modulated beams into a single frequency multiplexed modulated output beam.

2. The combination as defined by claim 1, wherein the continuous wave dye laser includes an etalon whose thickness is determinative of the wavelength spacing between the plurality of bands.

3. The combination as defined by claim 2 wherein the dye is Rhodamine 6G.

4. The combination as defined by claim 1, wherein the means for dividing the light energy in each band into two components and the means for recombining the two components are each a polarization beam splitter formed of a crystal of a birefringent material.

5. The combination as defined in claim 4, wherein the means for applying simultaneously independently modulated electric fields includes a pair of parallel strip electrodes disposed on opposite sides of the electro-optic crystal associated with each component, the pair of electrodes being parallel to and coplanar with the associated component.

6. The combination as defined by claim 5 wherein the means for spatially separating the bands of light energy is a pair of identical direct-vision prism spectroscopes each comprising a low-dispersion optic element and a high-dispersion optic element, said first prism causing a wavelength-dependent angular dispersion of the light energy emitted by the dye laser, said second prism causing a wavelength-dependent angular dispersion in the opposite sense from that which occurred in the first prism, said light emerging from said second prism comprising a plurality of parallel, spatially separated beams of light, each beam of light corresponding to a narrow band of wavelengths.

7. The combination as defined by claim 6 wherein the means for combining the plurality of modulated beams is a second pair of direct-vision spectroscopes positioned in the path of beams emerging from the multichannel optical modulator, said second pair of direct-vision spectroscopes being identical with the first pair of direct-vision spectroscopes, said second pair of direct-vision prism spectroscopes causing the wavelength dependent angular dispersion to each of said beams of light and causing said beam emerging from said second pair of direct-vision prism spectroscopes to be recombined into a single frequency multiplexed modulated coaxial output laser beam.

8. The combination as defined in claim 1, wherein there is further included means for reseparating the frequency multiplexed output beam into the plurality of modulated beams, and a demodulator for extracting the wideband information from the beams.

9. The combination as defined in claim 8, wherein the demodulator includes a polarizer disposed in the path of each of the modulated beams to convert the modulation from the polarization modulation to intensity modulation, and a like plurality of photodetectors, an individual one of which is associated with each beam to convert the intensity modulated beam to an electrical signal.

10. The combination as defined by claim 4 wherein the electro-optic crystal is chosen from the group consisting of ammonium dihydrogen phosphate, potassium dideuterium phosphate, potassium dihydrogen phosphate, lithium tantalate, and lithium niobate.

11. The combination as defined by claim 10 wherein the electro-optic crystal is ammonium dihydrogen phosphate.

12. The combination as defined by claim 4 wherein the beam splitter is a calcite crystal.

13. The combination as defined by claim 12 wherein the rotation means is a crystal of quartz.

* * * * *